Aug. 30, 1938. G. A. KLIMEK 2,128,560
TORQUE CONVERTER
Filed Sept. 25, 1935 4 Sheets-Sheet 2
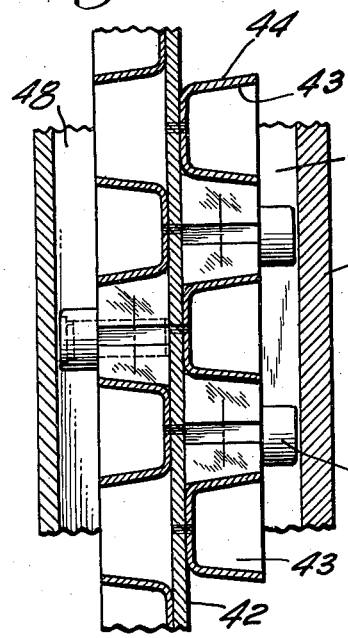
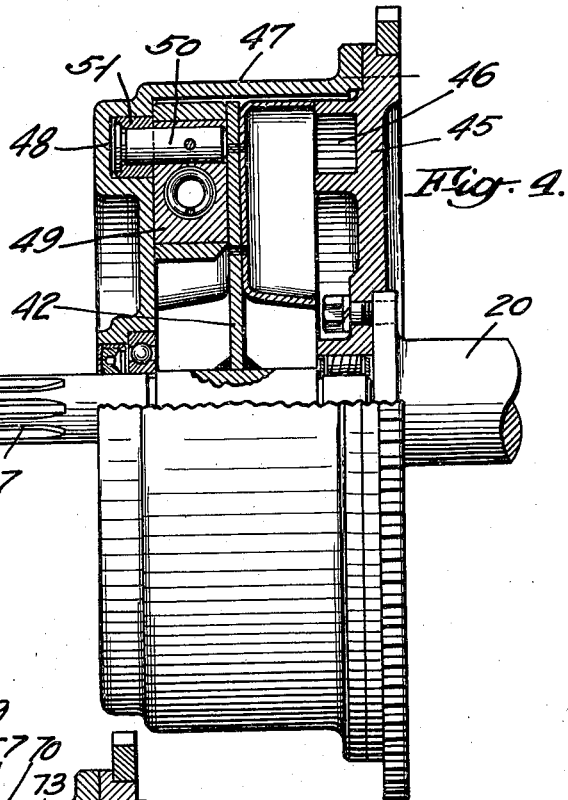
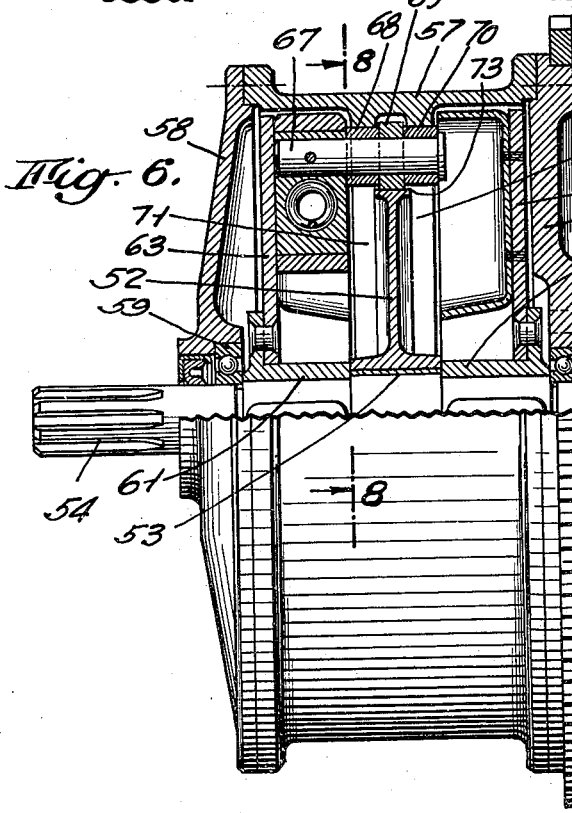
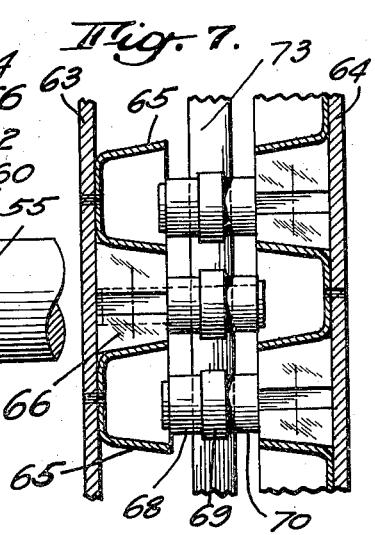
INVENTOR.
Gustav A. Klimek
BY Hoguet, Neave & Campbell
ATTORNEY.

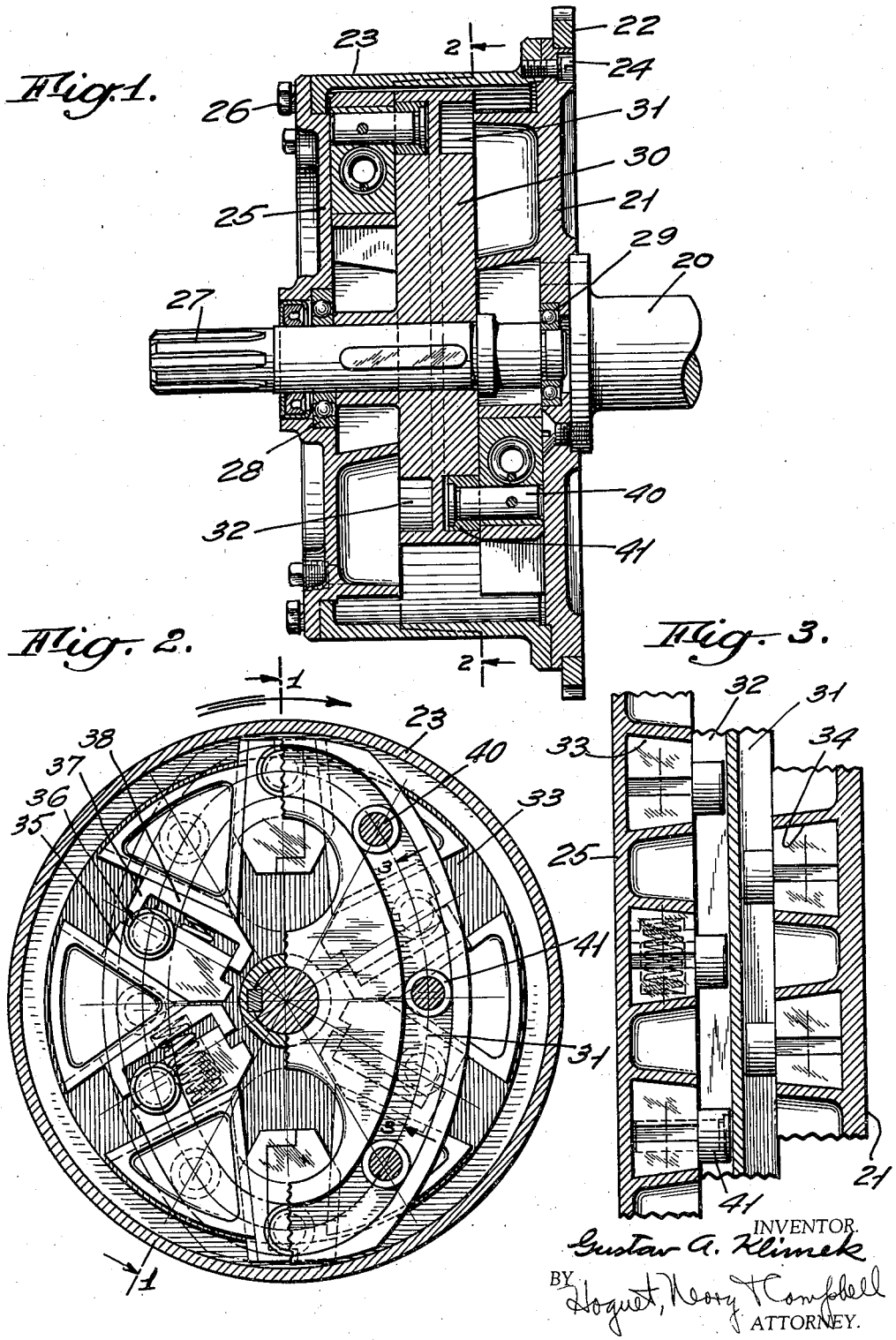

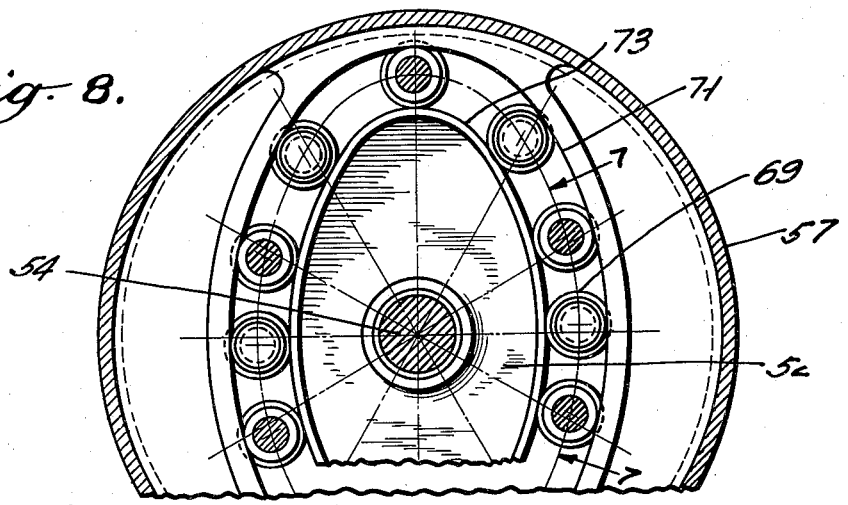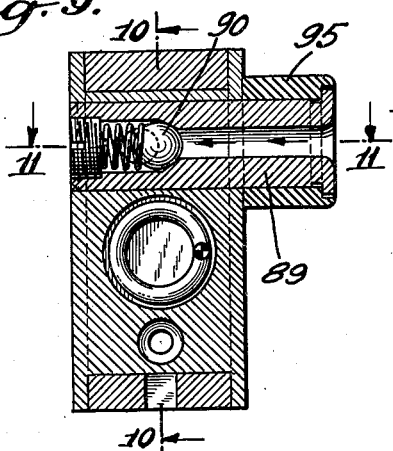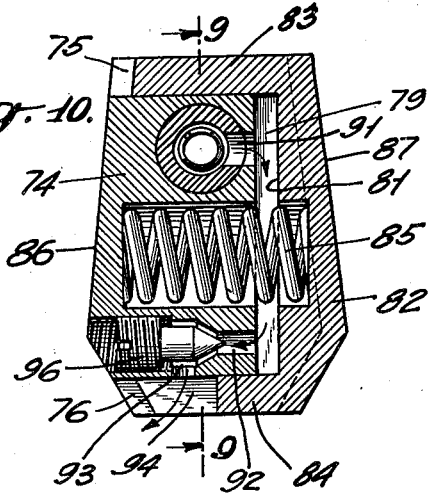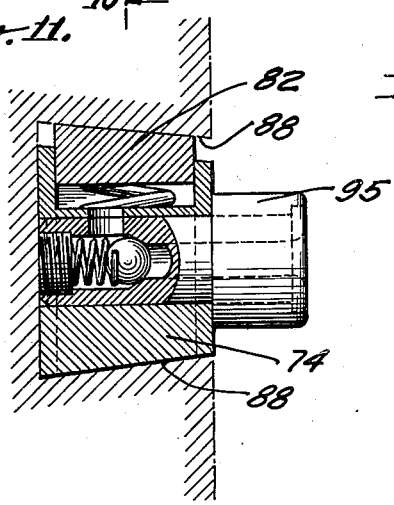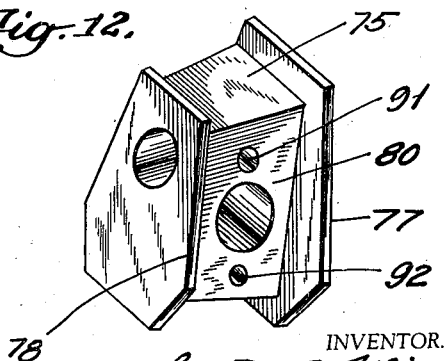

IMPELLERS IN SERIES

IN SPLIT-PHASE

IN PARALLEL

Patented Aug. 30, 1938

2,128,560

UNITED STATES PATENT OFFICE 2,128,560

TORQUE CONVERTER

Gustav A. Klimek, East Rutherford, N. J., assignor to Diehl Corporation, New York, N. Y., a corporation of New York Application September 25, 1935, Serial No. 41,977

16 Claims. (Cl. 74—63)

The present invention relates to devices for transmitting torque and embodies, more particularly, an improved torque transmitting mechanism by means of which the desired torque amplification may be secured between driving and driven members, at the same time, provision being made for varying the smoothness with which power is transmitted. More particularly, the invention embodies a torque transmitter of the above character wherein a plurality of transmitting devices are provided in such fashion that the relationship between the power impulses of such devices may be varied to secure the transmission of power by means of the periodic impulses of each of the devices, the construction being such that the impulses may be utilized simultaneously or alternately or in any desired phase relation.

Devices have heretofore been provided by means of which torque may be transmitted by amplification thereof from a driving to a driven member and the present invention utilizes the broad principles of such existing devices, additionally providing a means for multiplying the torque through two or more amplifying systems, the power impulses of which may be used in synchronism or alternately or in any desired phase relation. The invention further contemplates the provision of a transmitter of the above character wherein the torque is amplified by means of devices which function both hydraulically and mechanically. In this connection, features of the invention include improved mechanical features by means of which the strain to which certain of the moving parts are ordinarily subjected may be removed.

An object of the invention, accordingly, is to provide a torque transmitting mechanism including two or more amplifying systems of such character that the power impulses thereof may be utilized either simultaneously or alternately or in any desired phase relationship.

A further object of the invention is to provide torque amplifying mechanism of the above character wherein hydraulic as well as mechanical amplifying mechanism may be utilized.

A further object of the invention is to provide a device of the above character wherein the mechanical elements are so constructed that the stress to which the moving parts are subjected is absorbed by elements which maintain the parts of the mechanism in predetermined relationship.

Further objects of the invention will be apparent as it is described in further detail in connection with the accompanying drawings, wherein Figure 1 is a view in longitudinal section, taken through the axis of a transmitting mechanism constructed in accordance with the present invention. This section is taken on the broken line 1—1 of Figure 2 and looking in the direction of the arrows;

Figure 2 is a view in section, taken on the broken line 2—2 of Figure 1 and looking in the direction of the arrows;

Figure 3 is a partial view in section, taken on the line 3—3 of Figure 2 and looking in the direction of the arrows;

Figure 4 is a view in side elevation, partly broken away and in section, showing a modified form of the invention;

Figure 5 is a view similar to Figure 3, showing portions of the device of Figure 4;

Figure 6 is a view similar to Figure 4 showing a further modification of the invention;

Figure 7 is a view in section similar to Figure 5, showing the impeller spacing of the device of Figure 6, this view being taken on the line 7—7 of Figure 8;

Figure 8 is a view in transverse section taken on the line 8—8 of Figure 6, and looking in the direction of the arrows;

Figure 9 is a view in section taken through the impeller assembly and on the line 9—9 of Figure 10, looking in the direction of the arrows;

Figure 10 is a view in section taken on the line 10—10 of Figure 9 and looking in the direction of the arrows;

Figure 11 is a view in section taken on the line 11—11 of Figure 9 and looking in the direction of the arrows;

Figure 12 is a perspective view showing the main impeller block and the recesses into which a coacting part fits for forming the fluid reactance chamber;

Figure 13:
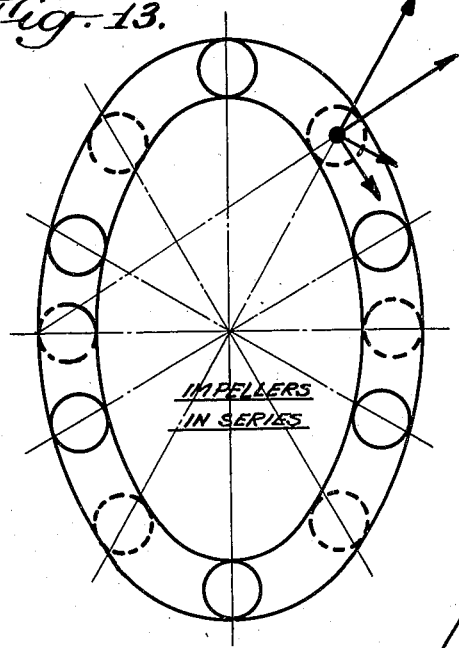
Figure 13 is a diagrammatic illustration of the manner in which the torque impulses transmitted by the two amplifying systems occur alternately or in series.

With reference to the construction shown in Figures 1, 2 and 3, a driving member is shown at 20 and is provided with a plate 21 which is suitably secured thereto and upon which a gear ring 22 may be provided. A cylindrical housing 23 is secured to the plate 21 by suitable means such as bolts 24, and has secured to the other end thereof an end plate 25 by means of bolts 26. These elements are so formed as to provide for a degree of angular adjustment between 23 and 25. A driven shaft 27 is journaled in the plate 25 at 28 and the end thereof is received in a bearing 29 carried by the plate 21.

This driven shaft has splined thereto a disc 30 in the opposite sides of which elliptical grooves 31 and 32, respectively, are formed.

Plate 25 has a plurality of equally spaced grooves 33 formed therein, the side walls of the grooves converging to provide a dovetail formation which gives, in effect, a wedging action upon the impeller members to be described hereinafter. Similar grooves 34 are formed in the plate 21. The grooves 33 and 34 extend radially from the axis of the mechanism and, in the construction shown, are spaced at 60 degree intervals about the device.

Within the grooves 33 and 34 are received impeller members shown as being formed of blocks 35 having spaced shoulders 36 over which parallel arms 37 of cooperating impeller portions 38 are slidably received. A spring 39 normally urges the members 35 and 38 outwardly against the adjacent sides of the respective grooves, the sides of the blocks 35 and 38 being tapered in conformity with the tapered sides of the grooves. Shafts 40 are secured in the blocks 35 and carry rollers 41 which are received within the elliptical grooves 31 and 32. It will thus be seen that the gib construction afforded by the blocks 35 and 38 relieves the blocks from the lifting action of the rollers 41 which, by reason of being offset with respect to the plane of the blocks, would otherwise subject the blocks to objectionable stresses.

Figure 16:
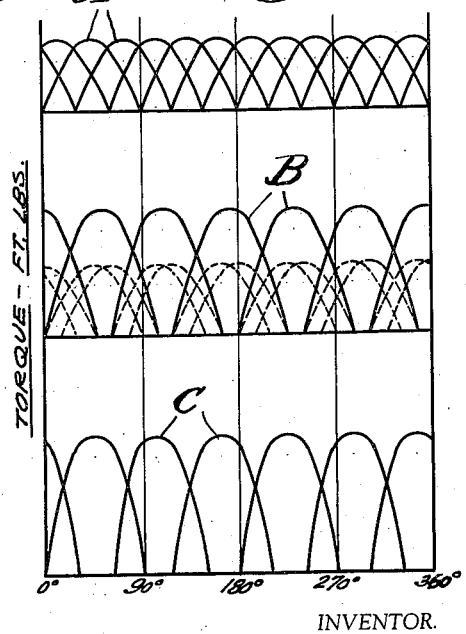
Figure 16 shows curves representing the torque characteristics of the devices in accordance with Figures 13, 14 and 15.

The angular position of the grooves 33 with respect to the grooves 34 determines the character of the power transmitted. For example, if the grooves 33 and 34 lie respectively in equally spaced angular positions, power will be transmitted through the device by impulses supplied alternately by the impellers of plate 25 and of plate 21. This condition is illustrated in Figure 13 wherein it will be seen that the angular spacing between each of the impellers of the plates 25 and 21 is 30 degrees and the impellers may thus be said to be in series. Under such condition, as illustrated in Figure 16 by curve A, a greater number of power impulses are provided, each of which is of relatively low magnitude. This results in a smoother transmission of power but of less torque magnitude.

Figure 15:
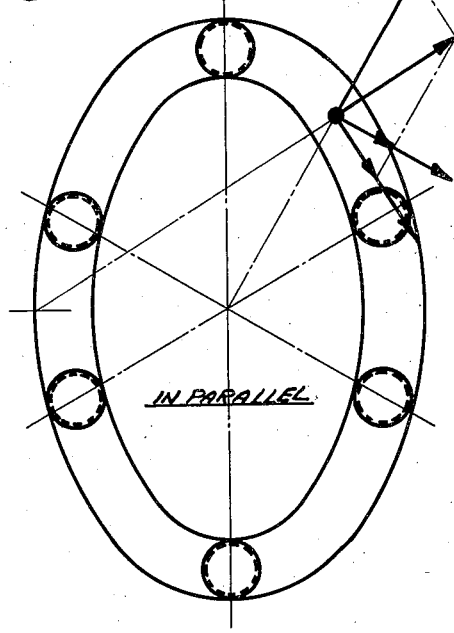
Figure 15 is a similar diagrammatic view showing the torque impulses transmitted by the two systems occurring simultaneously, which is the condition when the systems are functioning in parallel.

If the grooves 33 and 34 lie in the same radial planes, as illustrated in Figure 15, then the power impulses transmitted by the plates 21 and 25 occur simultaneously and the impellers may be said to be in parallel. Under such condition, half the number of impulses occur but the impulses are of twice the intensity of those occurring in the arrangement shown in Figure 13 because the mass per impulse is doubled. This condition is illustrated by the curve C of Figure 16.

Figure 14:
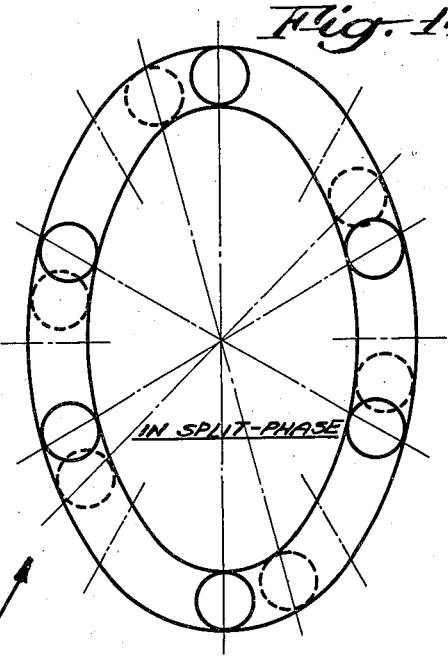
Figure 14 is a similar diagrammatic view showing the manner in which the torque impulses of the two impeller systems are split in phase to provide a greater torque intensity than in the arrangement shown in Figure 13.

By causing the impulses to occur in any desired phase, proportionate changes in the torque transmitted may be secured. For example, in Figure 14, the impulses occur in what may be termed split phase which represents a condition in which the impellers of one of the plates are positioned midway between the parallel and series positions. This is illustrated in Figure 14 and the characteristics of such arrangement are shown by the curve B in Figure 16.

In the construction shown in Figures 4 and 5, the driven shaft 27 carries a plate 42 which may be welded thereto and upon which groove forming members 43 may be welded. The sides 44 of members 43 are preferably tapered to provide the desired groove formation shown in Figure 3 and the resulting advantages thereof above mentioned. An end plate 45 is carried by the driving shaft 20 and is formed with an elliptical groove 46, a housing member 47 being adjustably secured angularly to the plate 45 and formed with an elliptical groove 48. Impeller blocks 49 are received in the grooves formed between the sides 44 of the members 43, being provided with shafts 50 upon which rollers 51 are provided. The rollers 51 engage the respective grooves 46 and 48 and the operation of the mechanism is similar to that described in connection with the constructions shown in Figures 1, 2 and 3. Inasmuch as the angular position of the housing 47 with respect to the plate 45 may be varied, the phase relationship of the power impulses provided by the members 49 upon opposite sides of the plate 42 may be correspondingly varied.

The construction shown in Figures 6, 7 and 8 illustrates an embodiment of the invention which is, in principle, similar to the construction shown in Figures 1, 2 and 3 in that there is provided, as in the construction shown in Figures 1, 2 and 3, a central track forming plate 52, this element being journaled at 53 upon the driven shaft 54. The driving shaft 55 is provided with a plate 56, adjacent the outer periphery of which a cylindrical housing member 57 is provided. An end plate 58 is secured to the housing 57 and serves as a closure for the mechanism.

The driven shaft 54 is journaled at 59 and 60 in the plates 58 and 56, respectively, and is provided with hubs 61 and 62 which are splined thereto. Plates 63 and 64 are secured to the hubs 61 and 62, respectively, and are provided with guide members 65, the opposite sides of which are formed to provide grooves having converging sides within which inertia members 66 are received. These members are similar to the inertia members 49 of the construction shown in Figures 4 and 5 and are provided with shafts 67 upon which rollers 68, 69 and 70 are journaled. Roller 69 is positioned centrally of the rollers 68 and 70 and is adapted to engage tracks 71 and 72, respectively, formed upon the inner periphery of the cylindrical member 57. Roller 69 engages a track 73 formed upon the external periphery of plate 52.

As shown in Figure 8, the track 73 is elliptical in form and concentric with the internal tracks 71 and 72 formed upon the cylindrical member 57. The construction shown in Figures 6, 7 and 8 relieves the shafts and inertia members from strains incident to the tendency of the elements to be displaced by reason of the fact that shafts 67 are offset with respect to the plane of motion of the inertia members. By providing the tracks in the manner described above, the shafts 67 are effectively maintained in planes including the orbital movement of these members.

In Figures 9, 10, 11 and 12, there is shown a modified form of inertia member by means of which hydraulic as well as mechanical inertia effects are secured. In this construction, members or blocks 74 are provided with grooves 75 and 76 upon the opposite ends thereof. Parallel flanges 77 and 78, formed upon the block 74 at its ends and at one side thereof, form the grooves 75 and 76 and also provide the sides of a liquid chamber 79 included between wall 80 on the block 74 and wall 81 formed upon a movable chamber forming member 82. The member 82 is provided with parallel arms 83 and 84 which are received within the grooves 75 and 76 and thus position the member 82 in its sliding motion with respect to the block 74. Spring 85 normally urges the member 82 away from the block 74 and thus causes the outer sides 86 and 87 of the block 74 and member 82, respectively, to engage the adjacent sides of the groove 88 formed in the adjacent movable element of the device.

The block 74 is provided with a hollow shaft 89 within which a check valve 90 is provided, the valve communicating with a duct 91 which in turn communicates with the chamber 79. An exhaust duct 92 discharges the liquid from the chamber 79 into a needle valve chamber 93 and to an exhaust duct 94. Motion of the inertia member 74 in the groove 88 is afforded by means of roller 95 which rides in an elliptical groove as described in the constructions shown in Figures 1 through 8. An adjustable needle valve 96 is provided in the chamber 93 and serves as a means for varying the restriction between the ducts 92 and 94.

From the foregoing, it will be seen that the mechanism shown in Figures 9, 10, 11 and 12 not only utilizes the mechanical reactance of the members 74 and 82, as in the constructions described in connection with Figures 1 through 8, but provides a hydraulic reactance by reason of the variable chamber 79, together with the check valve 90 and variable restricting device 96.

While the invention has been described with specific reference to the construction shown in the accompanying drawings, it is not to be limited, save as defined in the appended claims.

I claim:

1. A power transmitting device including driving and driven members, means affording separate paths through which power impulses may be transmitted, and means to vary the relationship of the impulses of power of one of the paths with respect to those of another of the paths.

2. A power transmitting device including driving and driven members, means affording separate paths through which power impulses may be transmitted, and means to vary the relationship of the impulses of power of one of the paths with respect to those of another of the paths from a position wherein the impulses of the paths occur simultaneously to a position wherein the impulses occur alternately at equal intervals.

3. A power transmitting device including driving and driven members, an elliptical groove formed in one of the members, a radial groove in the other of the members, an impeller slidably mounted in the radial groove, and means on the impeller engaging the elliptical groove.

4. A power transmitting device including driving and driven members, elliptical grooves in one of the members, radial grooves in the other of the members, impellers slidably mounted in the radial grooves, and means on the impellers engaging the elliptical grooves.

5. A power transmitting device including driving and driven members, elliptical grooves in one of the members, means to adjust the angular position of one of the elliptical grooves with respect to the other, radial grooves in the other of the members, impellers slidably mounted in the radial grooves, and means on the impellers engaging the elliptical grooves.

6. A power transmitting device including driving and driven members, oppositely extending elliptical grooves in one of the members, oppositely extending radial grooves in the other of the members, impellers slidably mounted in the radial grooves, and means on the impellers engaging the elliptical grooves.

7. A power transmitting device including driving and driven members, oppositely extending elliptical grooves in one of the members, means to adjust the angular position of one of the elliptical grooves with respect to the other, oppositely extending radial grooves in the other of the members, impellers slidably mounted in the radial grooves, and means on the impellers engaging the elliptical grooves.

8. A power transmitting device including driving and driven members, elliptical grooves in one of the members, radial grooves in the other of the members, impellers slidably mounted in the radial grooves, shafts on the impellers having rollers thereon extending transversely of the impellers and engaging the respective grooves, and tapered sides on the impellers and radial grooves.

9. A power transmitting device including driving and driven members, elliptical grooves in one of the members, radial grooves in the other of the members, impellers slidably mounted in the radial grooves, transversely extending shafts on the impellers, rollers on the shafts engaging the elliptical grooves, tapered sides on the impellers and radial grooves, and means to urge the sides of the impellers against the sides of the radial grooves.

10. A power transmitting device including driving and driven members, elliptical grooves in one of the members, radial grooves in the other of the members, impellers slidably mounted in the radial grooves, transversely extending shafts on the impellers, rollers on the shafts engaging the elliptical grooves, tapered sides on the impellers and radial grooves, said impellers being formed of a plurality of interengaging portions, springs to urge the portions apart, whereby the sides of the impellers will be urged against the sides of the grooves.

11. A power transmitting device including driving and driven members, spaced elliptical track forming elements on one of the members, elements on the other of the members forming radial grooves, impellers in the grooves, transverse shafts on the impellers, a plurality of rollers on the shafts engaging the tracks, and means to maintain the rollers against the tracks.

12. A power transmitting device including driving and driven members, spaced elliptical track forming elements on one of the members, elements on the other of the members forming radial grooves, impellers in the grooves, transverse shafts on the impellers, a plurality of rollers on the shafts engaging the tracks, an elliptical plate journaled on the said other of the members and formed with an elliptical track in a plane spaced between the planes of the first mentioned tracks, and rollers on the shafts engaging the last named track.

13. A power transmitting device including driving and driven members, a groove on one of the members, a radial groove on the other of the members having outwardly converging sides, an impeller block in the radial groove, a shaft on the block having means engaging the first groove, a cooperating impeller member slidably mounted on the block and forming a chamber therewith, and means to urge the impeller member and block apart.

14. A power transmitting device including driving and driven members, a groove on one of the members, a radial groove on the other of the members having outwardly converging sides, an impeller block in the radial groove, a shaft on the block having means engaging the first groove, a cooperating impeller section slidably mounted on the block and forming a chamber therewith, means to urge the sections apart, passages in the sections communicating between opposite sides of the block and the chamber, and a check valve in one of the passages.

15. A power transmitting device including driving and driven members, a groove on one of the members, a radial groove on the other of the members having outwardly converging sides, an impeller block in the radial groove, a shaft on the block having means engaging the first grooves, a cooperating impeller section slidably mounted on the block and forming a chamber therewith, means to urge the sections apart, passages in the sections communicating between opposite sides of the block and the chamber, a check valve in one of the passages and a needle valve in the other of the passages.

16. A power transmitting device including driving and driven members, a groove on one of the members, a radial groove on the other of the members having outwardly converging sides, an impeller block in the radial groove, a shaft on the block having means engaging the first grooves, a cooperating impeller section slidably mounted on the block and forming a chamber therewith, means to urge the sections apart, passages in the sections communicating between opposite sides of the block and the chamber, a check valve in one of the passages and a needle valve in the other of the passages, one of the passages extending through the shaft.

GUSTAV A. KLIMEK.